Patented Nov. 7, 1933

1,934,267

UNITED STATES PATENT OFFICE 1,934,267

HIGH GELATINATING COLLOIDAL COMPOUND

Louis H. Heyl, Lakewood, Ohio, assignor to The Wyodak Chemical Company, Cuyahoga Heights, Ohio, a corporation of Ohio No Drawing. Application January 26, 1932
Serial No. 589,064

4 Claims. (Cl. 252—6)

This invention relates to the production of a highly viscous colloidal compound, which may be used for various purposes, and which is especially suitable for use wherever an efficient binding material is required, or wherever it is desired to keep material in suspension in a liquid. More specifically my invention relates to the production of a colloidal compound which possesses superior gelling value, and which is capable of absorbing an increased volume of liquid and thereby producing a more viscous solution than has heretofore been obtainable.

Substances of high colloidal content, such as bentonite clay, montmorillonite, and the like are very useful as bonding agents and are extensively used in molding sand and other mixtures. In the presence of water these colloidal substances gell readily, and because of this characteristic, are extensively used for maintaining various materials in suspension in liquids, such as paint pigments, and also in producing washing solutions of superior detergent and emulsifying qualities.

I am aware that efforts have been made to increase the gelling value of bentonite, and like colloidal substances, by the addition of magnesium oxide or Portland cement, or other agents, and that the gelling value has actually been increased to some extent by this means. I have found, however, that the gelling value of bentonite, particularly bentonite of the variety found in the State of Wyoming and like colloidal substances, can be enormously increased by treating the bentonite with an alkaline agent or compound, consisting of calcium sulphate (gypsum) and magnesium oxide (magnesite) (magnesia). The admixing to bentonite of the calcium sulphate and magnesium oxide compound produces a highly viscous colloidal compound which, as to gelling value, is far superior to the natural colloidal clay.

The highly viscous colloidal compound of my invention is obtained by treating high colloidal clay, such as bentonite or montmorillonite with an alkaline agent consisting of 20 to 33⅓ per cent of calcium sulphate and 80 to 66⅔ per cent of magnesium oxide. The proportions of calcium sulphate and magnesium oxide may be varied somewhat within the limits mentioned, but up to the present time the best results have been obtained when the alkaline agent comprises 20 per cent of calcium sulphate and 80 per cent of magnesium oxide.

In producing my highly viscous colloidal compound I mix bentonite and the alkaline agent in the proportions of 98 to 95 per cent of standard Wyoming variety of bentonite to 2 to 5 per cent of the alkaline agent, although the proportions of these substances may be varied somewhat from the percentages mentioned. The colloidal clay may be finely pulverized and thereafter mixed with the calcium sulphate-magnesium oxide compound, or if desired, the colloidal clay, calcium sulphate, and magnesium oxide may all be mixed together in their crude state and then pulverized and ground. It will be understood, of course, that each of the ingredients mentioned is initially crushed and dried prior to the pulverizing or mixing operation. It may also be desirable to mix the calcium sulphate with the bentonite, and thereafter mix the magnesium oxide with the treated bentonite as a separate operation.

For purposes of comparison sample water solutions may be made and tested, using standard Wyoming variety bentonite in one instance, and in another instance using my highly viscous colloidal compound, comprising the above defined mixture of standard Wyoming variety bentonite, calcium sulphate and magnesium oxide. The first sample is prepared by mixing fifteen grams of pulverized standard Wyoming variety bentonite with 400 c. c. of distilled water. This mixture is agitated for one hour in a laboratory shaker turning, partly filled, 1000 cubic centimeter bottles end over end at the rate of 50 revolutions per minute, after which the mixture is poured into a standard hydrometer jar and tested by inserting a standard hydrometer for measuring heavy liquids therein. As the result of many such tests I find that the mixture has a specific gravity of approximately 1.020 or from 2° to 3° Baumé.

The second sample is prepared and measured in exactly the manner outlined above, except that instead of the standard Wyoming variety bentonite, my highly viscous colloidal compound is used in making the solution, and the resulting mixture is found to have a specific gravity of from 1.700 to 2.000 or higher, or, in other words, a density of from 60° to 72° or higher Baumé.

The reason for the beneficial result, produced by treating the bentonite clay with the compound of calcium sulphate and magnesium oxide, is not definitely known, but it is thought that the latter substances increase the swelling properties or absorption power of the colloidal cells of the clay, resulting in a more viscous water solution than could be obtained with untreated bentonite. A complete average analysis of my gelatinating colloidal compound, consisting of an average grade of Wyoming variety bentonite with a 5 per cent admixture of the calcium sulphate-magnesium oxide compound is as follows:

| | | |
|---|---|---|
| $SiO_2$ | (silicon dioxide) | 57.95 |
| $Fe_2O_3$ | (hematite) | 2.89 |
| $FeO$ | (iron oxide) | .32 |
| $MnO$ | (manganese oxide) | .09 |
| $Al_2O_3$ | (aluminum oxide) | 19.93 |
| $CaO$ | (calcium oxide) | .75 |
| $MgO$ | (magnesium oxide) | 6.55 |
| $K_2O$ | (potassium oxide) | .33 |
| $Na_2O$ | (sodium oxide) | 2.24 |
| $SO_3$ | (sulphur trioxide) | 1.02 |
| $H_2O$ | (water) at 110° C | 2.95 |
| | Loss on ignition | 4.84 |

As the result of careful observation and study of the effects produced upon bentonite by calcium sulphate and magnesium oxide, I find that bentonite treated with magnesium oxide possesses a gelling value which is superior to that of untreated bentonite, but that when bentonite has been treated with calcium sulphate as well as magnesium oxide, the resulting gelling value of the bentonite is not only enormously superior to that produced by the magnesium oxide treatment but is also more uniform in character. In other words, I find that the calcium sulphate performs the function of an agent, which increases, in magnitude, and also in uniformity, the beneficial effect obtained in treating bentonite with magnesium oxide, so that aqueous solutions, using various grades of bentonite which have been treated according to my invention, will be consistently found to produce a gell having a density of about 70° Baumé. It will thus be seen that the treatment of bentonite with calcium sulphate increases and stabilizes the effectiveness of the magnesium oxide. It is well known that magnesium oxide is relatively costly as a commercial item, and since the amount of this substance which need be added to the bentonite, is materially reduced by the action of the calcium sulphate, I regard the treatment of the bentonite with the latter substance as an important aspect of my invention.

It will be understood from the foregoing description that I have produced a colloidal compound having gelling value enormously superior to that of natural colloidal clay, and far superior to the gelling value of colloidal clay which has been treated with any of the various substances heretofore proposed. This improved colloidal compound produces better suspension of organic matter, as well as of mineral matter in various liquid solutions. Likewise the superior gelling value of this compound produces greater bond strength when added to organic and/or mineral matter mixtures which have been tempered with water to a desired consistency. The greater absorption properties of this colloidal compound produces superior detergent qualities when used with soap and other ingredients in a washing compound, and is more effective in emulsifying mineral and animal oils and greases in the washing solution, with the result that the fabrics being washed or treated do not become blotched or spotted with grease.

In the foregoing description, I have mentioned several uses to which my highly viscous colloidal compound may be put, but my invention should not be regarded as limited in its usefulness to the particular applications mentioned, since it may be used for various other purposes.

In the specification and claims I have referred to bentonite clay of the Wyoming variety as being the bentonite clay contemplated by my invention, but it should be understood that the expression "Wyoming variety" is not used with the intention of limiting the invention to apply only to bentonite clay obtained within the geographical boundaries of the State of Wyoming, but is used as a convenient means of designating a particular variety of bentonite clay, it being well known in the industry that this particular variety of bentonite clay is also found in other geographical locations, such as in the States of South Dakota, Nevada and California.

While I have disclosed the compound of my invention and the manner of producing and using the same, in a more or less detailed manner, it should be understood, however, that I do not intend to limit myself to the precise proportions and ingredients mentioned, but regard my invention as including such changes and modifications as do not involve a departure from the spirit of the invention and the scope of the appended claims.

Having thus described my invention, what I claim is:

1. A highly viscous colloidal compound comprising approximately 95 per cent high colloidal clay of the Wyoming variety, approximately 4 per cent magnesium oxide, and approximately 1 per cent calcium sulphate.

2. A compound comprising a colloidal substance such as bentonite clay of the Wyoming variety, and an admixture for increasing the gelling value of the colloid, said admixture comprising 80 to 66⅔ per cent magnesium oxide and 20 to 33⅓ per cent calcium sulphate.

3. A compound for increasing the viscosity of a gelatinating colloid such as bentonite clay of the Wyoming variety, said compound comprising 20 to 33⅓ per cent of calcium sulphate, and 80 to 66⅔ per cent of magnesium oxide.

4. A high gelatinating compound comprising 95 to 98 per cent of bentonite of the Wyoming variety, and from 5 to 2 per cent of an alkaline agent for increasing the gelling value of the bentonite, said agent comprising 20 to 33⅓ per cent of calcium sulphate and 80 to 66⅔ per cent of magnesium oxide.

LOUIS H. HEYL.